United States Patent
Kimura

(10) Patent No.: US 11,425,275 B2
(45) Date of Patent: Aug. 23, 2022

(54) PACKET SAVING OR DISCARDING BASED ON POWER STATUS OF DEVICE

(71) Applicant: CANON KABUSHIKI KAISHA, Tokyo (JP)

(72) Inventor: Tomohiro Kimura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 16/824,798

(22) Filed: Mar. 20, 2020

(65) Prior Publication Data

US 2020/0314280 A1 Oct. 1, 2020

(30) Foreign Application Priority Data

Mar. 29, 2019 (JP) .............................. JP2019-068070

(51) Int. Cl.
*H04N 1/00* (2006.01)
*H04L 12/10* (2006.01)

(52) U.S. Cl.
CPC ......... *H04N 1/00896* (2013.01); *H04L 12/10* (2013.01); *H04N 1/00904* (2013.01)

(58) Field of Classification Search
None
See application file for complete search history.

(56) References Cited

U.S. PATENT DOCUMENTS

| | | | | |
|---|---|---|---|---|
| 2010/0324730 A1* | 12/2010 | Muller | .............. | H04L 12/40163 700/245 |
| 2011/0040992 A1* | 2/2011 | Mizunashi | ......... | H04N 1/00896 713/310 |
| 2013/0155933 A1* | 6/2013 | Kneckt | ................ | H04W 48/16 370/312 |
| 2013/0198546 A1* | 8/2013 | Fujisawa | ................ | H04L 12/12 713/323 |
| 2014/0164807 A1* | 6/2014 | Okazawa | ........... | H04N 1/32032 713/323 |
| 2014/0269290 A1* | 9/2014 | Cors | ..................... | H04L 63/101 370/232 |

FOREIGN PATENT DOCUMENTS

JP   2006259906 A   9/2006
JP   2017149119 A   8/2017

* cited by examiner

*Primary Examiner* — Eric A. Rust
(74) *Attorney, Agent, or Firm* — Venable LLP

(57) ABSTRACT

An information processing device comprises a network interface including a buffer; a main controller; and a power controller that controls power using a first power mode in which power supplied to the main controller is limited and a second power mode in which a greater amount of power is supplied to the main controller. The network interface, if receiving a packet triggering a transition to the second power mode in the first power mode, stores the packet to the buffer memory and executes control such that, among packets received during a period until when the device starts operating in the second power mode, packets satisfying a discard condition are not stored and packets not satisfying a discard condition are stored. If the device is operating in the second power mode, even packets satisfying a discard condition are stored.

19 Claims, 6 Drawing Sheets

PACKET SAVING OR DISCARDING BASED ON POWER STATUS OF DEVICE

BACKGROUND OF THE INVENTION

Field of the Invention

The present invention relates to an information processing device, a control method of the information processing device, and a medium.

Description of the Related Art

There is increasing demand for reduced power consumption in information processing devices such as printers and digital multi-function peripherals. In response to this demand, a technique is known with which the power mode of an information processing device is shifted from a normal power mode to a power saving mode if the information processing device is not operating for a predetermined amount of time, for example. In the normal power mode, power is supplied to both a main control unit and a communication unit of the information processing device. On the other hand, in the power saving mode, the supply of power to the communication unit of the information processing device is continued but the supply of power to the main control unit of the information processing device is stopped. Accordingly, in the power saving mode, the overall power consumption of the information processing device is reduced compared to in the normal power mode. However, in general, there are only limited types of processing functioning in the power saving mode, and if it is determined that processing cannot be executed in the power saving mode, the power mode is shifted from the power saving mode to the normal power mode to execute the processing. Note that there are also cases in which, in the information processing device, network packets (hereinafter "packets") received during the shift between power modes are buffered by the communication unit and are then processed by the main control unit after the transition to the normal power mode is completed. For example, in Japanese Patent Laid-Open No. 2006-259906, a configuration is described in which, in a case in which the communication unit cannot respond to a packet received during the power saving mode, a response to the packet is provided after the main control unit is brought back to operation. Furthermore, in Japanese Patent Laid-Open No. 2017-149119, there also is a technique such that, in a case in which the communication unit has the function of responding to a packet, the return from the power saving mode to the normal power mode is performed after a response to the packet is returned in advance by the communication unit, in order to maintain the communication with an external device in a normal state even during the shift between power modes.

SUMMARY OF THE INVENTION

In the present invention, packets that are received by an information processing device during processing for shifting between power modes are analyzed, and the received packets that are to be buffered are selected.

An information processing device that the present invention provides has the following configuration.

According to one aspect of the present invention, an information processing device is provided, the device comprising: a network interface including a buffer memory; a main controller; and a power controller that controls the supply of power to the network interface and the main controller by using a plurality of power modes at least including a first power mode in which the information processing device is operated in a state in which power supplied to the main controller is limited and a second power mode in which the information processing device is operated in a state in which a greater amount of power can be supplied to the main controller than in the first power mode, wherein a processor of the network interface, if receiving a packet that triggers a transition to the second power mode via the network interface in a state in which the information processing device is operating in the first power mode, stores the packet to the buffer memory and executes control such that, among packets that are received via the network interface during a period until when the information processing device starts operating in the second power mode based on power control by the power controller, packets that satisfy a discard condition based on a discard pattern are not stored to the buffer memory and packets that do not satisfy a discard condition based on the discard pattern are stored to the buffer memory, and wherein, if the information processing device is operating in the second power mode, even packets satisfying a discard condition based on the discard pattern are stored to the buffer memory.

According to the present invention, the possibility of necessary packets being lost during processing for returning from the power saving mode to the normal power mode can be reduced by the information processing device selecting and buffering packets received during the return processing.

Further features of the present invention will become apparent from the following description of exemplary embodiments with reference to the attached drawings.

DESCRIPTION OF THE EMBODIMENTS

Figure 1:
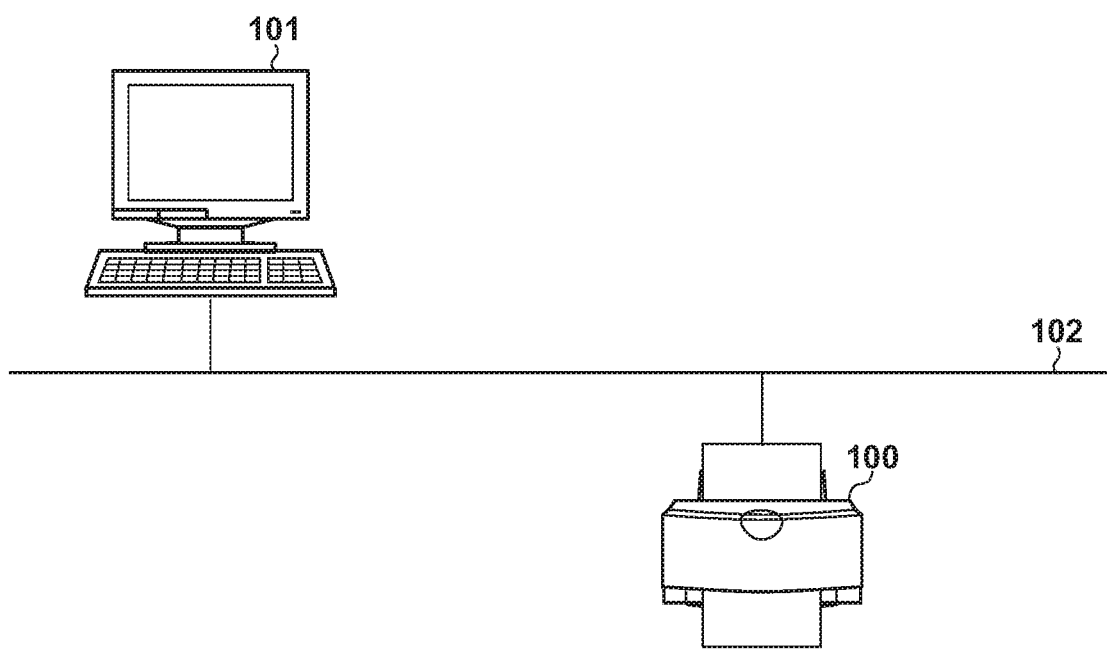
FIG. 1 is a diagram illustrating a network environment in which an image forming device 100 is installed.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

With regard to a packet (hereinafter "return packet") that triggered the shift of the state of an information processing device from a power saving mode to a normal power mode, it is desirable for the packet to be transferred to a main control unit after the shift to the normal power mode is completed. Furthermore, it is desirable that a buffer area be utilized so that all received packets that are received during the shift of the state are also buffered in the buffer area and transferred to the main control unit.

For example, in a protocol such as the multicast Domain Name System (mDNS), there is a possibility of a single query (request) arriving in a state in which the query is divided into a plurality of packets. It is necessary to buffer these subsequently-received packets in the buffer area and transfer the packets to the main control unit.

Here, the present embodiment focuses on the surrounding network conditions, the limited size of the buffer area for buffering packets received during the shift processing, and the possibility of the occurrence of cases in which not all received packets can always be buffered.

Generally speaking, the buffering of received packets may bring about a situation in which the buffer capacity becomes full, if the information processing device is installed in an environment in which the information processing device receives a large number of packets in a short amount of time or if it takes a long time for the information processing device to perform the shift processing, for example.

The present embodiment describes an information processing device that has the function of selectively buffering packets, in order to increase the possibility that necessary subsequently-received packets can be received after the shift to the normal power mode is completed, even if the above-described situations occur.

Embodiment 1

FIG. 1 illustrates one example of a network environment (also referred to as a network system) in which an information processing device is installed. In the network environment illustrated in FIG. 1, an image forming device 100, which is an information processing device, and a personal computer (PC) 101 are present. The devices are connected to one another via a network 102.

The image forming device (printer) 100 executes print processing by receiving print data from the PC 101. The printer 100 also receives requests for device information from the PC 101 and responds to the requests with the device information, which is information regarding consumables, etc. Furthermore, the image forming device 100 is in an environment in which the image forming device 100 receives various packets flowing over the network 102, including packets that are for the PC 101 to communicate with devices other than the printer 100.

Image Forming Device Hardware

Figure 2:
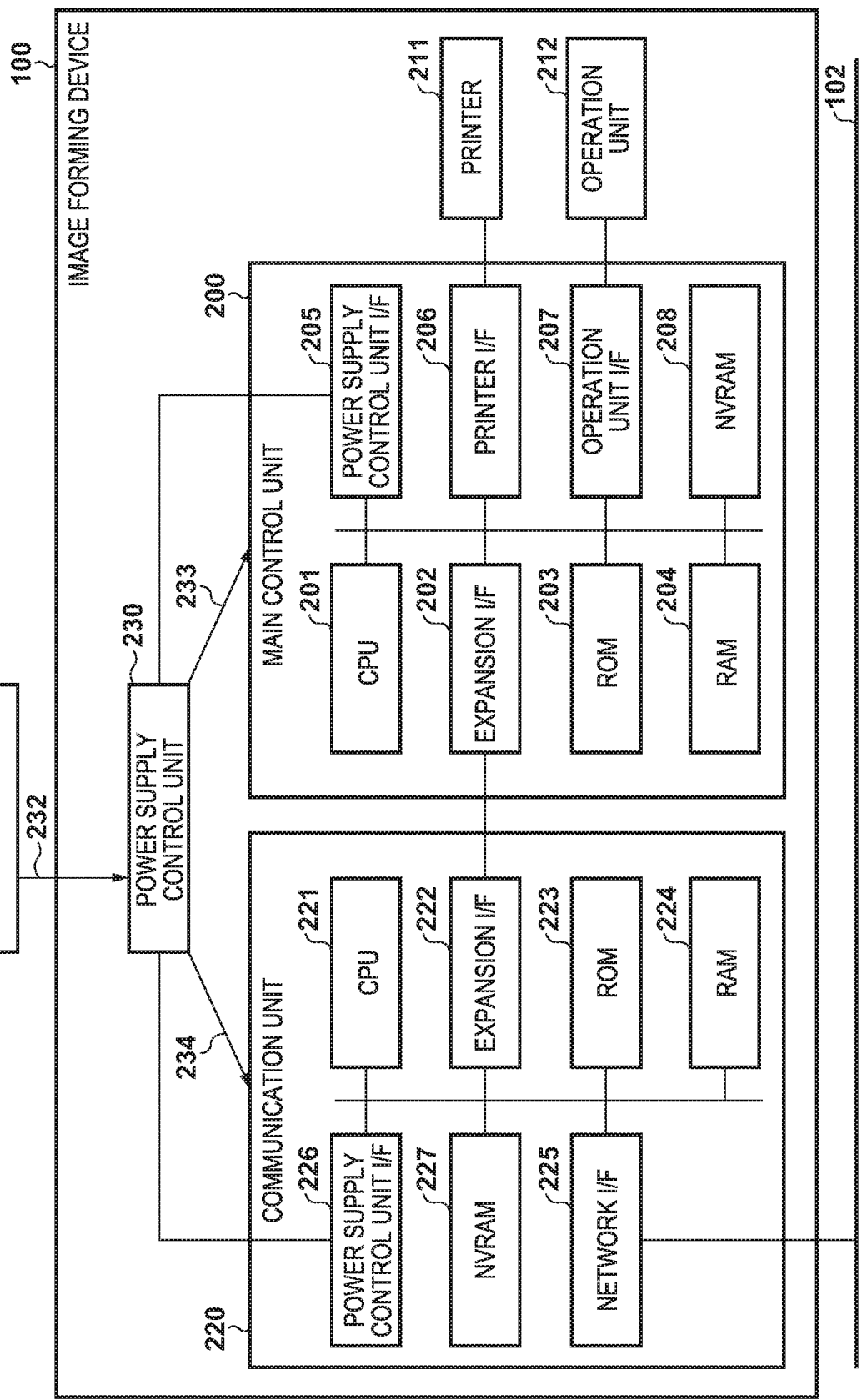
FIG. 2 is a diagram illustrating a hardware configuration of the image forming device 100.

First, the hardware configuration of the image forming device 100, which is an information processing device, will be described using FIG. 2. The image forming device 100 is an image forming device having a print function. Note that, while a description of an information processing device in the present embodiment will be provided taking a printer as an example thereof, the information processing device is not limited to a printer. For example, the information processing device may be an image forming device such as a digital multi-function peripheral having a copy function and a scan function, or may be a device having other functions.

The image forming device 100 includes a main control unit 200, a printing unit 211, an operation unit 212, a communication unit 220, and a power supply control unit 230. The configuration of each unit will be described. The main control unit 200 will be described. The main control unit 200 includes a central processing unit (CPU) 201, an expansion interface (I/F) 202, a read only memory (ROM) 203, a random access memory (RAM) 204, a power supply control I/F 205, a printing unit I/F 206, an operation unit I/F 207, and a non-volatile RAM (NVRAM) 208. The units are connected so that the units can communicate with one another via a communication bus.

The CPU 201 reads out a control program stored in the ROM 203, and controls the operation of the entire image forming device 100. The RAM 204 is used as the main memory of the CPU 201 and as a temporary storage area such as a work area. The NVRAM 208 is a non-volatile memory, and is used as a storage area for storing various types of information, such as configuration information of the image forming device 100. The expansion I/F 202 performs communication with the communication unit 220. Note that, while it is regarded here that the main control unit 200 of the image forming device 100 performs the different types of processing illustrated in the later-described flowcharts by using one CPU 201 and one memory (the RAM 204), other forms may also be adopted. For example, the processing may be executed by having a plurality of processors and a plurality of RAMs or other unillustrated storage media, such as HDDs, to cooperate with one another.

The printing unit I/F 206 connects the main control unit 200 and the printing unit 211. The printing unit 211 executes print processing based on print commands. The print data to be printed by the printing unit 211 is transferred from the main control unit 200 to the printing unit 211 via the printing unit I/F 206.

The operation unit I/F 207 connects the main control unit 200 and the operation unit 212. The operation unit 212 includes a liquid crystal display unit having a touch panel function, a keyboard, etc. Information input by users using the operation unit 212 is transferred to the main control unit 200 via the operation unit I/F 207. In such a manner, the operation unit 212 functions as a display unit that presents information to users, and as a reception unit that receives information from users.

The power supply control unit I/F 205 connects the main control unit 200 and the power supply control unit 230. The later-described instruction to shift to the power saving mode is transferred from the main control unit 200 to the power supply control unit 230 via the power supply control unit I/F 205.

The communication unit 220 will be described. The communication unit 220 includes a CPU 221, an expansion I/F 222, a ROM 223, a RAM 224, a network I/F 225, a power supply control unit I/F 226, and a NVRAM 227. The units are connected so that the units can communicate via a bus. While it is assumed that the communication unit 220 is an independent application specific integrated circuit (ASIC), the communication unit 220 may be a structure capable of being detached from the image forming device 100, such as a network interface card (NIC). The main control unit 200 is connected to the network 102 via the communication unit 220, and is capable of communicating with external devices such as the PC 101. Note that the communication unit 220 is a unit that controls communication, and may be referred to as a communication control unit in contrast to the main control unit.

The CPU 221 reads out a control program stored in the ROM 223, and controls the operation of the communication unit 220. The RAM 224 is used as the main memory of the CPU 221 and as a temporary storage area such as a work area. The NVRAM 227 is a non-volatile memory, and is used as a storage area for storing various types of information, such as configuration information of the communication unit 220. The expansion I/F 222 performs communication with the main control unit 200. Note that, while it is regarded here that the communication unit 220 performs the different types of processing illustrated in the later-described flowcharts by using one CPU 221 and one memory (the RAM 224), other forms may also be adopted. For example, the processing may be executed by having a plurality of processors and a plurality of RAMs or other unillustrated storage media, such as HDDs, to cooperate with one another. Furthermore, some processing may also be realized by using hardware circuits, DSPs, etc.

The network I/F 225 is connected to the network 102, and performs the transmission and reception of data to and from external devices such as the PC 101. Data received by the network I/F 225 is processed by the CPU 221, and is transferred to the main control unit 200.

The power supply control unit I/F 226 connects the communication unit 220 and the power supply control unit 230. The later-described instruction to return from the power saving mode to the normal power mode is transferred from the communication unit 220 to the power supply control unit 230 via the power supply control unit I/F 226.

The power supply control unit 230 converts the AC power supplied from a power source 231 via a power source supply line 232 into DC power, and supplies DC power to the main control unit 200 and the communication unit 220 via power supply lines 233 and 234. Note that, in the present embodiment, the power supply control unit 230 supplies DC power also to each of the printing unit 211 and the operation unit 212 via an unillustrated power supply line. The power supply control unit 230 controls the power mode of the image forming device 100 based on the shift instruction for causing the power mode to shift to the power saving mode and the return instruction for causing the power mode to return to the normal power mode, which are received from the power supply control unit I/F 205 and the power supply control unit I/F 226.

Next, the power modes that the image forming device 100 has will be described. The image forming device 100 has two power modes, namely the normal power mode and the power saving mode.

Table 1 illustrates whether or not power is supplied to each of the units in each power mode. In a case in which the image forming device 100 is operating in the normal power mode, power is supplied from the power supply control unit 230 to both the main control unit 200 and the communication unit 220. In this case, power may be supplied at all times to both the printing unit 211 and the operation unit 212. Alternatively, if these units are not being used, the supply of power to the units that are not being used may be stopped. That is, the normal power mode is a power mode in which power is supplied from the power supply control unit 230 to at least both the main control unit 200 and the communication unit 220.

On the other hand, in a case in which the image forming device 100 is operating in the power saving mode, the communication unit 220 executes the processing of packets transmitted from external devices such as the PC 101 in place of the main control unit 200. In this case, the communication unit 220 determines the processing to be performed on a received packet based on discard patterns.

Figure 4:
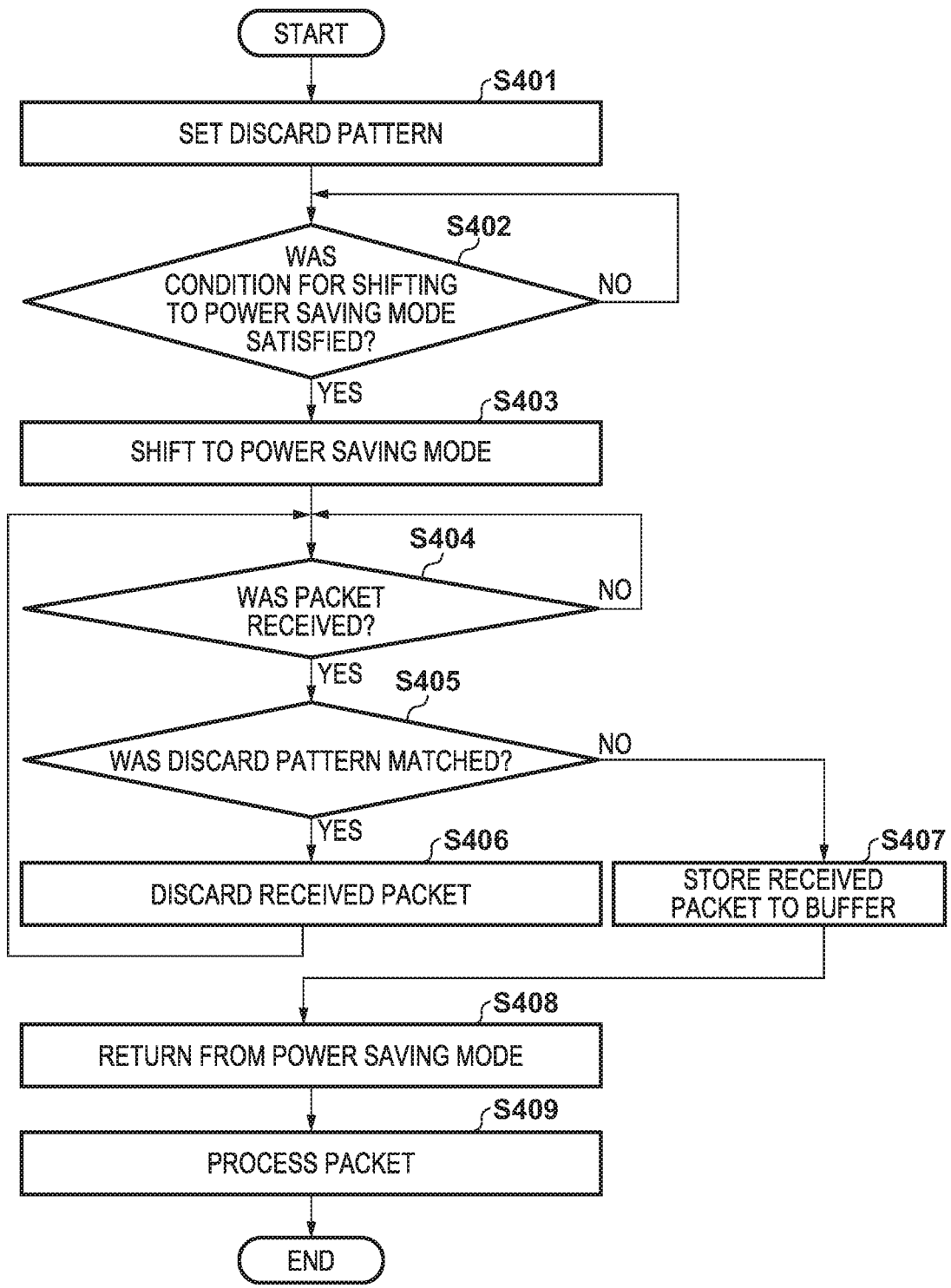
FIG. 4 is a flowchart illustrating processing pertaining to a power saving mode of the image forming device 100.

The processing performed when the image forming device 100 executes the shift to the power saving mode and the return to the normal power mode will be described in detail in FIG. 4. Note that, in the power saving mode, the supply of power to the main control unit 200 is basically stopped. Due to this, in order to preserve the information stored in a volatile memory such as the RAM 204, the main control unit 200 enters a state in which power is supplied to only some devices such as a non-volatile memory, or a state in which the information is temporarily saved to the NVRAM 227 or another non-volatile memory. The present embodiment will be described assuming a form in which power is supplied to some devices even in the power saving mode. However, a form in which the information is saved to a non-volatile memory may be adopted as a solution in the present invention.

TABLE 1

| | Normal Power Mode | Power Saving Mode |
|---|---|---|
| Main Control Unit 200 | Supplied | Not Supplied (Except for Some Parts) |
| Printing Unit 211 | Not Considered | Not Supplied |
| Operation Unit 212 | Not Considered | Not Supplied |
| Communication Unit 220 | Supplied | Supplied |

Image Forming Device Software

Figure 3:
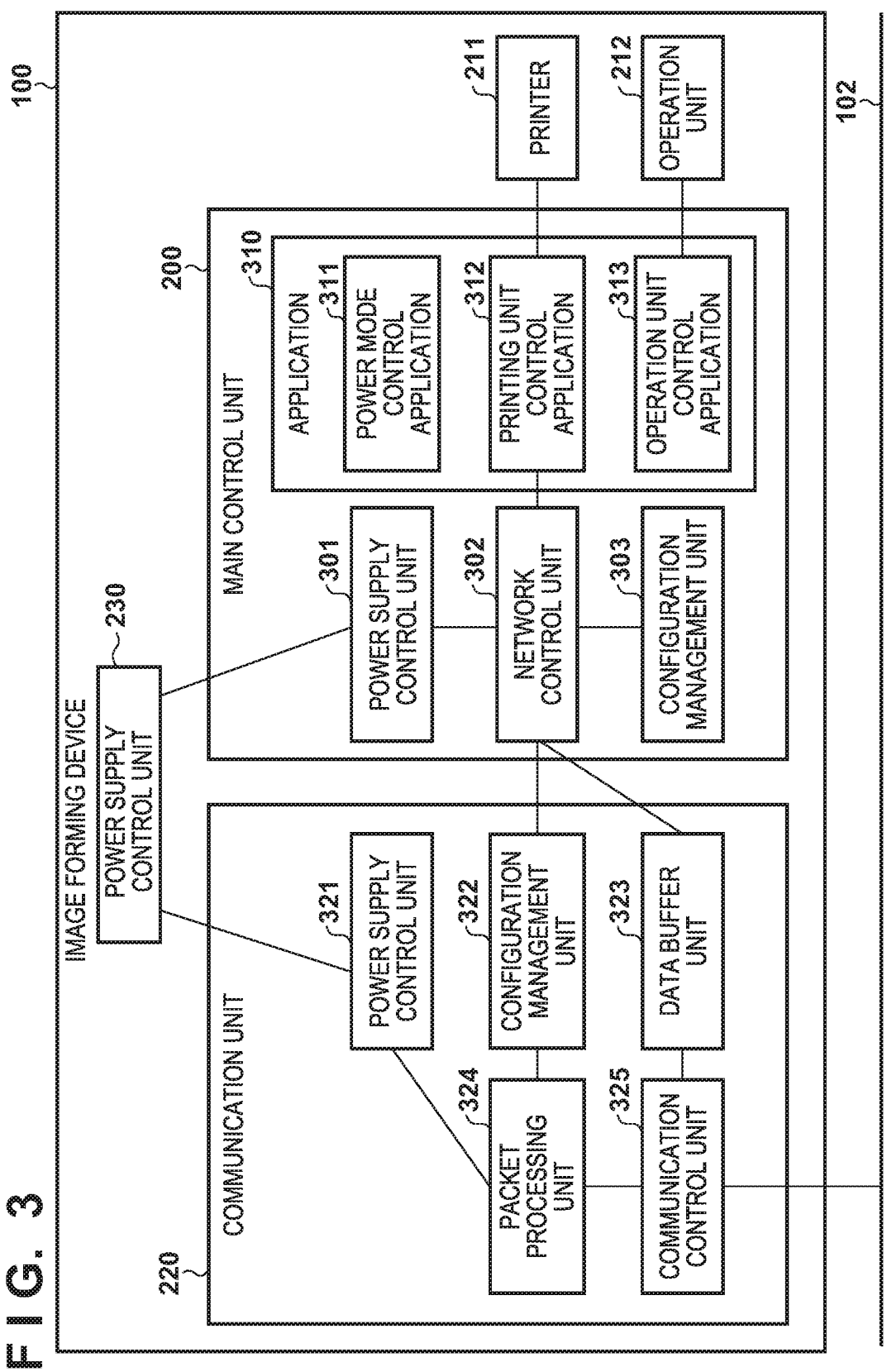
FIG. 3 is a diagram illustrating a software configuration of the image forming device 100.

The configuration of software blocks of the image forming device 100, which is an information processing device, will be described using FIG. 3. Note that the software configuration described in the present embodiment is one example, and the software configuration for realizing the present invention is not limited to this.

The image forming device 100 includes control programs for controlling the units, on the respective units. First, in the main control unit 200, the CPU 201 loads the control program stored in the ROM 203 to the RAM 204 and executes control processing.

The control program of the main control unit 200 includes a power supply control unit 301, a network control unit 302, a configuration management unit 303, and applications 310. Furthermore, the applications 310 include a power mode control application 311, a printing unit control application 312, and an operation unit control application 313. The power supply control unit 301 communicates with the power supply control unit 230, and transfers the instruction to shift to the power saving mode to the power supply control unit 230. The network control unit 302 controls the communication between the main control unit 200 and the communication unit 220. For example, the network control unit 302 transfers packets that the image forming device 100 uses when communicating with external devices such as the PC 101, and transfers configuration information, such as IP addresses and discard patterns, to be used by the control program of the communication unit 220 in the power saving mode. The configuration management unit 303 reads out and stores configuration information stored in storage devices such as the RAM 204 and the NVRAM 208. For example, the configuration management unit 303 performs the management of network-related configuration information, such as IP addresses, and configuration information such as operation configurations in the power saving mode, which include packet discard patterns, etc.

The applications 310 are a group of applications realizing functions of the image forming device 100. The power mode control application 311 determines whether or not the shift to the power saving mode can be performed, provides the power supply control unit 301 with an instruction to shift to the power saving mode, and provides the network control unit 302 with an instruction to set operation configurations to the communication unit 220. Furthermore, the power mode control application 311 analyzes a packet that triggered a return from the power saving mode. If it is determined that the packet is a packet that the image forming device 100 does not need to process, the power mode control application 311 generates a discard pattern from the analysis result of the packet, and records the discard pattern to the configuration management unit 303 as a new discard pattern and also sets the discard pattern to the communication unit 220. Note that, while packets that triggered the return from the power saving mode are analyzed and processed in the present embodiment, there is no limitation to this. Packets received in the normal power mode, packets received and buffered during the processing for returning from the power saving mode, etc., may be analyzed. The printing unit control application 312 receives print data received from an external device such as the PC 101 from the communication unit 220 via the network control unit 302, and transfers the data to the printing unit 211 after performing processing on the data so that the data can be printed by the printing unit 211. This makes it possible to execute print processing from external devices. Furthermore, the printing unit control application 312 acquires various states of the printing unit 211, and causes the configuration management unit 303 to store information such as the execution state of print processing and the remaining amount of consumables. The operation unit control application 313 performs processing for displaying configuration information stored by the configuration management unit 303, etc., on the operation unit 212, stores data that a user input via the operation unit 212 to the configuration management unit 303, and transfers the input data to the control units and applications. Due to this, input and output processing with respect to the image forming device 100 can be realized.

Next, in the communication unit 220, the CPU 221 loads the control program stored in the ROM 223 to the RAM 224 and executes control processing.

The control program of the communication unit 220 includes a power supply control unit 321, a configuration management unit 322, a data buffer unit 323, a packet processing unit 324, and a communication control unit 325. The power supply control unit 321 communicates with the power supply control unit 230, and transfers the instruction to return to the normal power mode to the power supply control unit 230. The configuration management unit 322 manages the input and output of data performed with storage devices such as the RAM 224 and the NVRAM 227. For example, the configuration management unit 322 writes information transferred from the network control unit 302, such as IP addresses and packet discard patterns, onto the RAM 224, and stores information such as a MAC address to the NVRAM 227.

The data buffer unit 323 is a storage area in which packets received by the communication unit 220 are buffered, until the packets are acquired by the network control unit 302. Note that the data buffer unit 323 is present in one of one or more storage areas (in the RAM 224 or the NVRAM 227), and packets that have been just received are temporarily stored in the data buffer unit 323 by hardware processing. At the same time as this, from the control program of the communication unit 220, the data buffer unit 323 can also be accessed via the configuration management unit 322. Furthermore, the data buffer unit 323 also performs buffering processing if the return processing is in progress and packets cannot be immediately transferred to the network control unit 302. Such packets include a packet that triggered the return of the image forming device 100 from the power saving mode.

The packet processing unit 324 executes analysis processing of packets received over the network 102 via the communication control unit 325. The packet processing unit 324 performs the determination of whether or not packets received during the power saving mode and during the processing for returning to the normal power mode from the power saving mode match discard patterns. If a received packet matches a discard pattern, the packet processing unit 324 discards the received packet and maintains the power saving mode. On the other hand, if a received packet does not match any discard pattern, the packet processing unit 324 transmits, to the power supply control unit 321, a command to return to the normal power mode from the power saving mode. The communication control unit 325 controls the input and output of packets to and from the network I/F 225. The communication control unit 325 stores a packet received by the network I/F 225 to the data buffer unit 323, and at the same time, notifies the packet processing unit 324 that a packet has been received. Furthermore, regardless of whether the image forming device 100 is in the normal power mode or the power saving mode, packets that are transferred onto the network 102 from the image forming device 100 are transmitted via the communication control unit 325. Note that the buffering may be performed for packets matching patterns, and packets other than these may be discarded. In this case, these patterns may be called selection patterns, for example. Further, discard patterns and selection patterns may be called patterns or selection patterns all together.

Note that the processing performed by the printing unit 211, the operation unit 212, and the power supply control unit 230 is realized by control programs included in the respective units.

Transition of Power Mode

Next, processing when the shift to the power saving mode and the return to the normal power mode are executed will be described using FIG. 4. This processing is executed by the CPU 201 and the CPU 221, and the control programs controlling the respective units. Steps executed by constituent elements belonging to the main control unit 200 are executed by the CPU 201, and steps executed by constituent elements belonging to the communication unit 220 are executed by the CPU 221.

First, in the normal power mode, the power mode control application 311 sets, to the configuration management unit 322 of the communication unit 220 via the network control unit 302, various parameters that the communication unit 220 uses in the power saving mode, from the information of the IP addresses and discard patterns read out from the configuration management unit 303 (step S401). In the present example, destination port numbers of packets to be discarded are set as discard patterns. However, the information to be registered as discard patterns is not limited to destination port numbers, and may be other types of information that could be determined from received packets. For example, in a case such as when a packet not only includes a description of a reception port but also includes a specific character sequence in the data payload portion, a combination of information that could be read from the packet may be registered as a discard pattern. In specific, in a protocol such as Web Services on Devices (WSD), in which a request for device capabilities can be made, a form may be adopted such as that in which a packet that requires the image forming device 100, which does not include a scanner, to have the capability of a scanner is set as a discard pattern. Furthermore, it suffices for the processing of setting the above-described parameters to be executed at least once at a timing such as when the image forming device 100 is activated, immediately before the shift to the power saving mode is performed, etc., as long as the processing is performed before the shift to the power saving mode. Note that step S401 may be executed asynchronously with the subsequent steps.

Then, the power mode control application 311 waits for the condition for shifting to the power saving mode to be satisfied (step S402). For example, the shift condition may be a clear instruction to perform the shift, the continuation, over a predetermined amount of time, of a state in which no print job is received from external devices, etc. Furthermore, other processing may be executed in parallel while step S402 is being repeated. The power mode control application 311 transmits an instruction to shift to the power saving mode to the power supply processing control unit 301 (step S403) if the condition for shifting to the power saving mode is satisfied by an instruction to shift to the power saving mode being issued by a user operation from the operation unit 212, etc., in a state in which the determination of the shift condition is being repeated. If the power supply processing control unit 301 receives an instruction to shift to the power saving mode, the instruction to shift is transferred to the power supply control unit 230. In a case in which data in a volatile memory is to be saved to a non-volatile memory, processing for saving the data is implemented before the instruction to shift to the power saving mode is transferred to the power supply control unit 230. The power supply control unit 230 shifts to the power mode that is in accordance with the power mode shift instruction that is received. In a case in which the power saving mode involves stopping the supply of power to the main control unit 200, the power supply control unit 230 stops the supply of power to the main control unit 200 and continues the supply of power to the communication unit 220. However, a configuration may be adopted such that, in a case in which the power supply control unit 230 returns to the normal power mode in response to an operation on the operation unit 212, power is supplied to a specific operation key of the operation unit 212 and the operation unit I/F 207, and if the specific operation key is operated, the power supply control unit 230 is notified of the operation by interruption, etc., for example. The supply of power may be locally continued in such a manner. Furthermore, a configuration may be adopted such that, even in the power saving mode, the supply of power to the main control unit 200 by the power supply control unit 230 is continued, and the power supply control unit 301 of the main control unit 200 supplies power to circuits that are necessary for reactivation and stops the supply of power to other parts.

Next, when the shift of the image forming device 100 to the power saving mode is completed, the communication control unit 325 enters a state in which the communication control unit 325 waits to receive packets (step S404). If the communication control unit 325 receives a packet in this state, the data of the packet is temporarily stored to the data buffer unit 323. If the packet processing unit 324 detects this, the packet processing unit 324 compares the destination port number of the received packet and the destination port numbers in the discard patterns stored on the configuration management unit 322 (step S405). If the packet processing unit 324 determines that the received packet matches (or corresponds to) a discard pattern, the received packet is discarded, and the state returns to the state for waiting for packets to be received while the power saving mode is maintained (step S406). Here, the data of the packet that was temporarily stored to the data buffer unit 323 is also deleted. On the other hand, if the packet processing unit 324 determines that the received packet does not match any discard pattern, the packet processing unit 324 newly stores the received packet to a buffer area of the data buffer unit 323 (step S407), and starts processing for returning from the power saving mode. This processing is processing for allowing the packet that triggered the return to the normal power mode to be processed by the main control unit 200 side, once the return to the normal power mode is completed. Here, the packet that triggered the return may be placed in the same buffer area as the buffer area used immediately after the reception of the packet, or may be placed in a dedicated buffer area for packets that trigger the return.

In the processing for returning from the power saving mode (step S408), the packet processing unit 324 notifies the power supply control unit 321 of a command to return to the normal power mode from the power saving mode. Based on this notification, the power supply control unit 321 requests the power supply control unit 230 to change the power state of the main control unit 200. As a result of this, the supply of power from the power supply control unit 230 to the main control unit 200 is started once again, a return signal is transmitted to the power supply control unit 230 of the main control unit 200, and the main control unit 200 executes processing for returning to the normal power mode.

If data in a volatile memory was saved to a non-volatile memory, processing of writing the data that was then saved to the non-volatile memory back to the volatile memory is performed. Note that, even during this return processing, packets received by the communication unit 220 are stored to the above-described buffer area by the packet processing unit 324 after the packets are processed by the packet processing unit 324. The processing performed by the packet processing unit 324 in this situation will be described in detail using later-described FIG. 5. Furthermore, in a case in which the supply of power from the power supply control unit 230 to the main control unit 200 has been continued, and the power supply control unit 301 of the main control unit 200 has been limiting the supply of power inside the main control unit 200, the power supply control unit 301 of the main control unit 200 starts the supply of power once again. Furthermore, when the shift to the normal power mode is completed, the communication unit 220 also stops the filtering of packets using discard patterns, and buffers all packets that are received. This switch of filtering processing may be performed after packets inside the buffer are output and free space is secured in subsequent step S409.

When the power supply control unit 301 detects the return signal from the power supply control unit 230, the power supply control unit 301 issues a notification of the return to the power mode control application 311. Once the power mode control application 311 receives the notification of the return, the power mode control application 311 executes processing necessary for the return processing with respect to each application. For example, if a notification of the return processing is issued to the printing unit control application 312, the power mode control application 311 executes activation processing of the printing unit 211. Furthermore, when the return processing on the main control unit 200 side is completed, the network control unit 302 acquires the packet that triggered the return and packets that were received and buffered during the return processing, all of which had been placed in the data buffer unit 323, and executes processing such as responding to each of the packets (step S409). Depending on the data to be processed, the processing in step S409 may be performed by the applications 310. Note that, if a packet does not need to be processed by the image forming device 100 in the first place even though the packet was not registered to a discard pattern, such a packet is discarded at this timing. An example of such a packet is a packet addressed to a reception port that is not open in the network control unit 302. Note that packets that are received during the return processing and that are considered necessary for processing are buffered by the later-described packet buffer processing. For example, a group of packets that may arrive in a state in which a single query is divided into a plurality of packets, such as those of an mDNS query, are also buffered. Accordingly, the main control unit 200 having returned from the power saving state processes this group of packets by acquiring the group of packets from the buffer, and the packets can be appropriately processed even if the return was performed in response to a request such as an mDNS request.

Packet Reception Processing During Power Saving Mode

Figure 5:
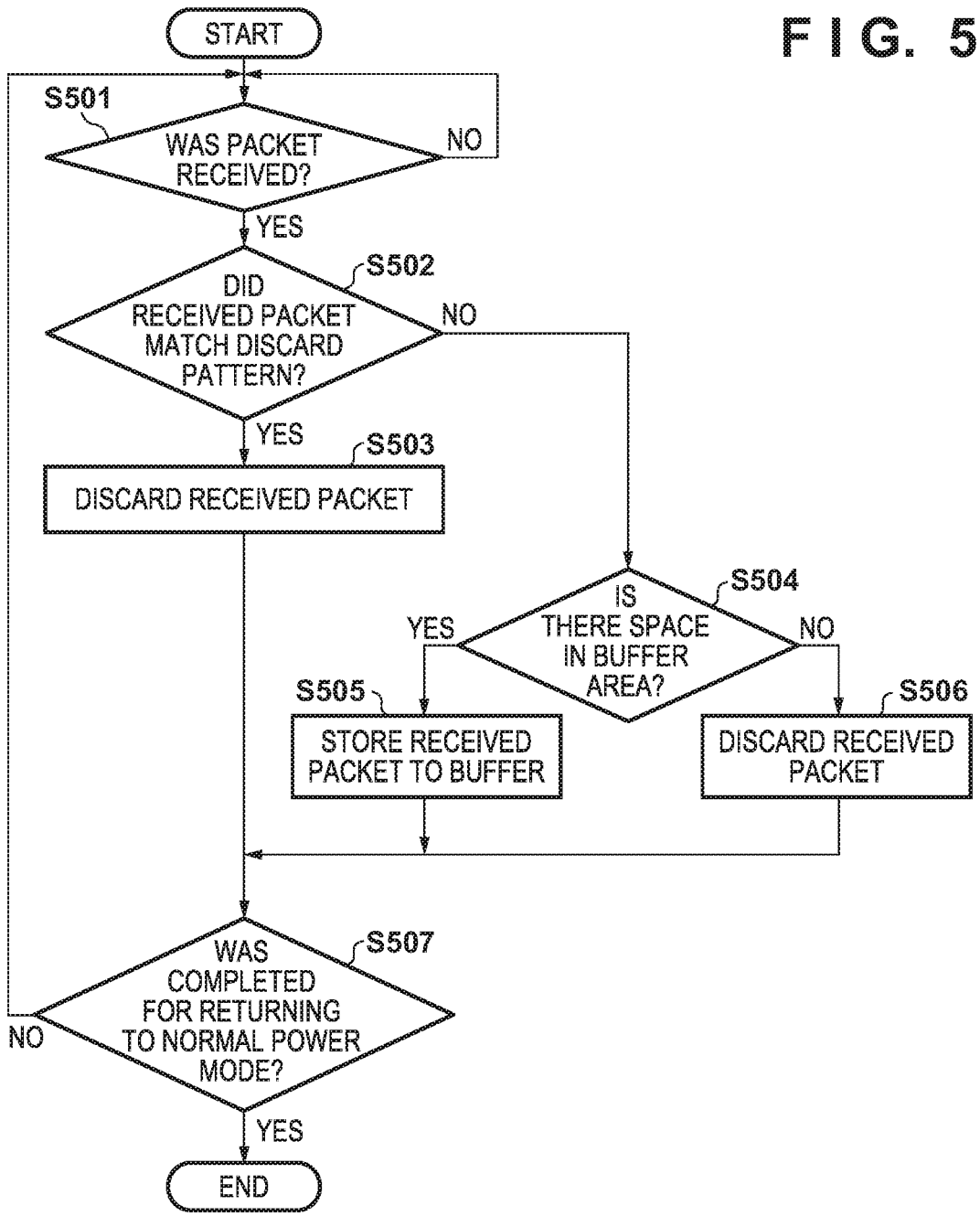
FIG. 5 is a flowchart illustrating processing for dynamically generating a discard pattern, pertaining to embodiment 1.

Processing for placing packets received by the image forming device 100 during the processing for returning from the power saving mode to the normal power mode in a buffer area will be described using FIG. 5. Even if the image forming device 100 is in the middle of the processing for returning from the power saving mode, the communication unit 220 processes received packets by using the packet processing unit 324, and buffers the packets in the data buffer unit 323.

First, if the communication unit 220 detects the reception of a packet (step S501), the communication unit 220 determines, based on discard patterns, whether the received packet matches a discard pattern (step S502). If it is determined that the received packet matches a discard pattern, the communication unit 220 does not perform buffering and discards the received packet (step S503). On the other hand, the communication unit 220 executes the buffering of the received packet only if it is determined that the received packet does not match any discard pattern, or that is, only if it is determined that the received packet needs to be processed by the main control unit 200. The discard patterns may be the same as those used in step S405 in FIG. 4.

Next, the packet processing unit 324 determines whether or not there is space in the area for buffering the received packet (step S504). If there is space in the buffer area, the packet processing unit 324 places the received packet in the data buffer unit 323, and buffers the received packet (step S505). If there is no space in the buffer area, the packet processing unit 324 discards the received packet (step S506). Then, the packet processing unit 324 repeats the above-described processing until the main control unit 200 completes the return processing and a notification to that effect is received from the network control unit 302 (step S507).

Packets that are buffered during the power saving mode and during the transition from the power saving mode to the normal power mode are acquired one after another and processed by the main control unit 200 after the return to the normal power mode is completed. In doing so, if the main control unit 200 were to acknowledge the loss of a packet, for example, the main control unit 200 may request the transmitter of the packet to transmit the packet again.

As described above, according to the present embodiment, even in the case of a packet received during the execution of the processing for returning from the power saving mode by the image forming device 100, it becomes unnecessary to place the packet in the buffer area if the packet does not need to be processed by the image forming device 100. Accordingly, necessary information from packets received during the return processing can be appropriately transferred to the main control unit 200, and the possibility can be reduced of packets being lost due to the return processing of the image forming device 100 being in progress.

Embodiment 2

In embodiment 1, a configuration was described in which, in a case in which the buffer area is full, received packets are uniformly discarded if the received packets do not match discard patterns. In embodiment 2, a measure will be described for selecting packets to be processed by the image forming device 100 having returned from the power saving mode more effectively, in a case in which the buffer area is full.

First, in order to realize the present embodiment, the level of priority with which a packet needs to be processed is set to packets received by the image forming device 100. For example, the destination IP addresses indicated by received packets may be used to set priority levels. Table 2 illustrates one example of the setting of priority levels, in which destination IP addresses are also used.

TABLE 2

| Priority Level | Destination IP Address |
|---|---|
| 1 | Unicast Address |
| 2 | Multicast Address |
| 3 | Broadcast Address |
| 4 | Other Addresses |

Priority level 1 indicates packets with the highest priority level, and priority level 4 indicates packets with the lowest priority level. For example, a unicast packet having a unicast address as the destination address is a packet that explicitly requires the image forming device 100 to perform some kind of processing. Hence, unicast packets can be determined as having the highest priority level, and priority level 1, which is the highest priority level, is assigned as the priority level of unicast packets. Next, a multicast packet with a multicast address needs to be processed with priority because the possibility is high that a specific request is being made with respect to a service provided by the applications 310 of the image forming device 100. Examples include the search of a service relating to the image forming device 100, etc., and a multicast packet may be a request including the clear intention of an external device. Hence, priority level 2 is assigned to multicast packets. Note that, while a broadcast packet having a broadcast address is intended to arrive at multiple destinations similarly to a multicast packet, a broadcast packet is transmitted with a large number of unidentified devices as destinations, whereas a multicast packet is transmitted with the destinations more or less specified. Due to this, in the present embodiment, priority level 3, which is lower in priority than the priority level assigned to multicast addresses, is assigned to broadcast addresses. Finally, priority level 4 is for packets that do not correspond to the packets with priority levels 1 to 3. Note that the priority levels set in the present embodiment are not limited to being ranked in this manner, and priority levels may be set to have a different ranking.

Packet Reception Processing During Power Saving Mode (Embodiment 2)

Figure 6:
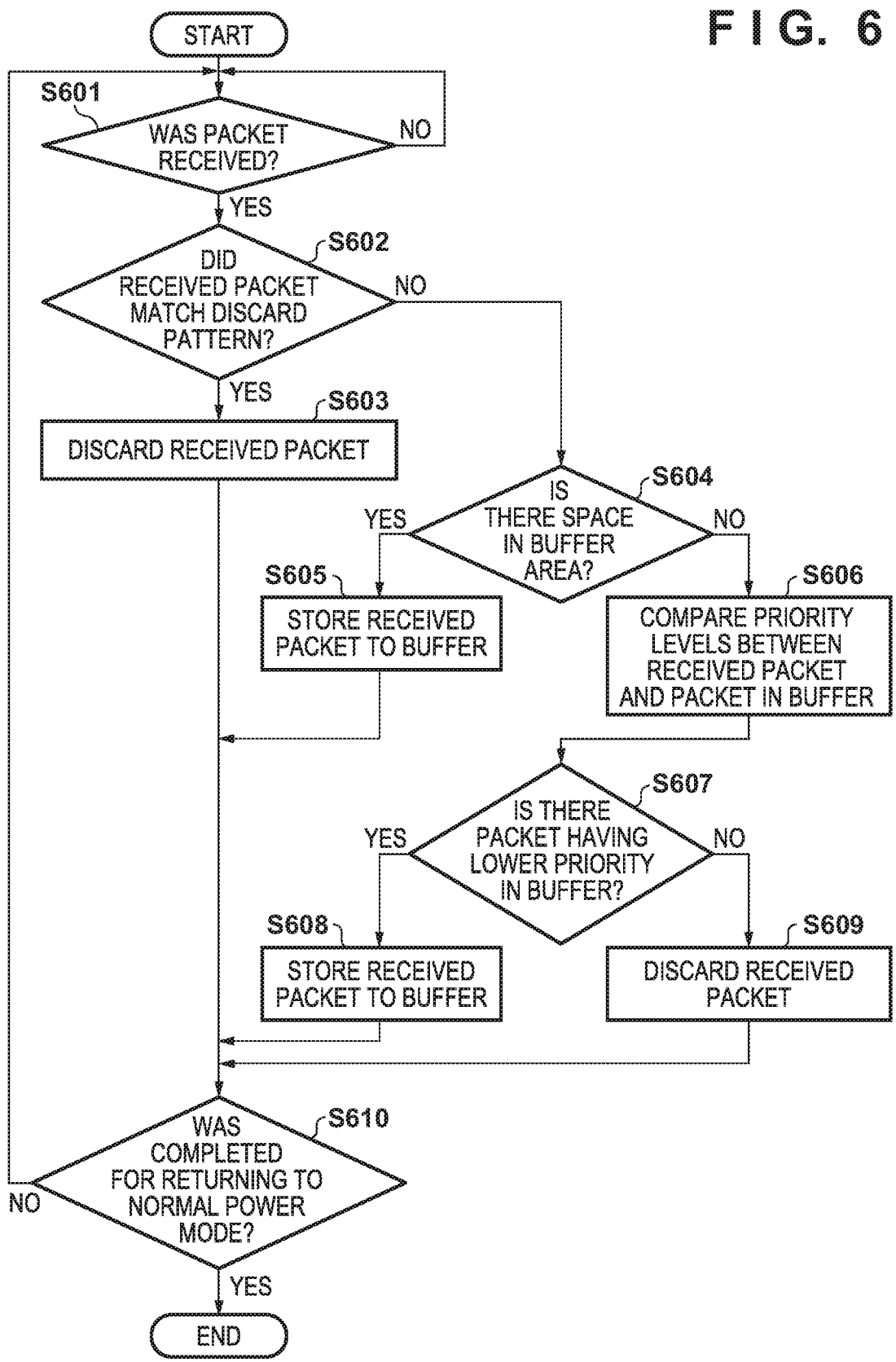
FIG. 6 is a flowchart illustrating processing for dynamically generating a discard pattern, pertaining to embodiment 2.

Next, processing in a case in which the buffer area becomes full during the return processing of the image forming device 100 will be described using FIG. 6. The processing procedures in FIG. 6 replace those in FIG. 5 in embodiment 1, and the present embodiment may be similar to embodiment 1 in terms of other configurations and processing. Even if the image forming device 100 is in the middle of the processing for returning from the power saving mode, the communication unit 220 processes received packets by using the packet processing unit 324, and buffers the packets in the data buffer unit 323.

First, if the communication unit 220 detects the reception of a packet (step S601), the packet processing unit 324 determines, based on discard patterns, whether the received packet matches a discard pattern (step S602). If it is determined that the received packet matches a discard pattern, the communication unit 220 does not perform buffering and discards the received packet (step S603). On the other hand, the communication unit 220 executes the buffering of the received packet if it is determined that the received packet does not match any discard pattern. Next, the packet processing unit 324 determines whether or not there is space in the area for buffering the received packet (step S604). If there is space in the buffer area, the packet processing unit 324 places the received packet in the data buffer unit 323, and buffers the received packet (step S605).

If there is no space in the buffer area, the packet processing unit 324 performs a comparison of priority levels between packets that are already buffered and the packet that the packet processing unit 324 was trying to buffer (step S606). The processing of comparing priority levels is realized by the packet processing unit 324 reading out the packets that are already buffered from the data buffer unit 323 and determining whether or not a packet with a lower priority level is present (step S607). For example, in a case in which the packet that the packet processing unit 324 is trying to buffer is a packet with a unicast address having priority level 1, the packet processing unit 324 checks whether or not there is a packet with priority level 2 or lower. If a packet with a lower priority level is already buffered, the packet processing unit 324 deletes the packet with the lower priority level, and stores the packet with the higher priority level to the data buffer unit 323, which is the buffer area, in place of the packet with the lower priority level (step S608). On the other hand, if there is no packet with a lower priority level in the buffer area, the packet processing unit 324 deletes the packet that the packet processing unit 324 is trying to buffer (step S609). Then, the packet processing unit 324 repeats the above-described processing until the main control unit 200 completes the return processing and a notification to that effect is received from the network control unit 302 (step S610).

As described above, according to the present embodiment, packets that are received while the image forming device 100 is executing the processing for returning from the power saving mode can be buffered more effectively. Accordingly, compared to embodiment 1, the present embodiment enables appropriately transferring packets that are more necessary, from among packets received during the return processing, to the main control unit 200, and in addition, reduces the possibility of packets being lost due to the return processing of the image forming device 100 being in progress.

Note that, if there are a plurality of packets with lower priority levels than that of the received packet in the buffer, the packet with the lowest priority level among such packets may be selected as the packet to be deleted. For example, if the buffer is full and the received packet has priority level 4, the received packet is discarded without referring to the contents of the buffer. If the received packet has priority level 3, a search is performed from the end of the buffer for a packet with priority level 4, the packet with priority level 4 that is found first is deleted, and the received packet is buffered in place of the deleted packet, for example. If the received packet has priority level 1, a search is performed from the end of the buffer for a packet with priority level 4, the packet with priority level 4 that is found first is deleted, and the received packet is buffered in place of the deleted packet. If there is no packet with priority level 4, a search is performed for a packet with priority level 3, and if there is also no packet with priority level 3, a search is performed for a packet with priority level 2. In such a manner, in a case in which a search for a packet that can be deleted is performed, the buffer may be scanned in order starting from a relatively low priority level.

Furthermore, if the buffer is a queue, the replacement of a packet in the middle of a queue would result in a change in the order of packets. Hence, the queue may be realized by adopting a structure in which packets are linked to one another with pointers. In this case, when deleting a packet in the buffer and storing the received packet, it suffices to reconnect the packets before and behind the deleted packet with pointers and to connect pointers so that the newly stored packet is at the end of the queue.

Furthermore, if a plurality of packets with the lowest priority level that could be replaced with the received packet are present in the buffer, the packet to be deleted may be selected further according to subordinate priority levels rather than the order in which packets are found. For example, reference may be made to port numbers, or that is, the services indicated by port numbers, as subordinate priority levels. In this case, a configuration may be adopted such that a service that requires only one packet to be received is regarded as having a lower priority level than a service in which a plurality of packets are received, and a packet with a lower priority level is preferentially deleted. As a matter of course, the packet to be deleted may be selected in accordance with other criteria.

Further, in order to make it easy to search the buffer for packets one priority level at a time, the number of packets of each priority level that are buffered may be stored each time a packet is buffered or deleted. If such a configuration is adopted, by referring to the number of packets of each priority level in a case in which the buffer is full, it is possible to find out whether or not there is a packet that could be replaced with the received packet without having to perform a search among the packets in the buffer. Furthermore, because the priority level of the packet to be found in the buffer could be known in advance before performing a search, it becomes unnecessary to carry out unnecessary searches.

Other Embodiments

In each of the above-described embodiments, a configuration has been described in which the determination of whether or not there is space in the buffer area is performed after determining whether or not there is a matching discard pattern. However, it is permissible for the processing order of the above-described determination processes to vary.

Furthermore, in embodiment 2, a configuration has been described in which destination addresses are used as the factor based on which priority levels are set. However, the factor based on which priority levels are set is not limited to destination addresses, and any information that could be read from received packets suffices. For example, the factor based on which priority levels are set may be protocol types such as TCP, UDP, and ICMP, or may be a combination with other types of information such as destination addresses.

Furthermore, in embodiment 2, a configuration is adopted in which a received packet is discarded if the buffer is full with packets with high priority levels placed in the buffer area. However, a configuration may be adopted in which a packet having the same priority level is replaced by the received packet by combining a different type of information, e.g., the packet that is replaced has the earliest reception time.

By adopting the other embodiments described above, the processing of packets by the communication unit 220 can be made more efficient, and it becomes possible to more precisely set the priority levels of packets that should be buffered. Accordingly, compared to embodiments 1 and 2, it becomes possible to appropriately transfer packets that are more necessary, from among packets received during the return processing, to the main control unit 200, and in addition, the possibility can be reduced of packets being lost due to the return processing of the image forming device 100 being in progress.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-068070, filed Mar. 29, 2019 which is hereby incorporated by reference herein in its entirety.

What is claimed is:

1. An information processing device comprising:
a network interface including a buffer memory;
a main controller; and
a power controller that controls the supply of power to the network interface and the main controller by using a plurality of power modes at least including a first power mode in which the information processing device is operated in a state in which power supplied to the main controller is limited and a second power mode in which the information processing device is operated in a state in which a greater amount of power can be supplied to the main controller than in the first power mode,
wherein, during transition from the first power mode to the second power mode, a processor of the network interface stores received packets to the buffer memory and executes control such that, among packets that are received via the network interface, packets that satisfy a discard condition based on a discard pattern are not stored to the buffer memory and packets that do not satisfy a discard condition based on the discard pattern are stored to the buffer memory, and
wherein one or more packets stored during the transition from the first power mode to the second power mode are transferred to the main controller.

2. The information processing device according to claim 1,
wherein the network interface includes a storage area for storing the discard pattern, and
the processor of the network interface, if determining that a packet received via the network interface during a period in which the information processing device is operating in the first power mode or during a transition period from when a packet triggering a transition to the second power mode is received until when the information processing device starts operating in the second power mode satisfies a discard condition based on the discard pattern stored in the storage area, executes control such that the packet satisfying the discard condition is not stored to the buffer memory.

3. The information processing device according to claim 2,
wherein a processor of the main controller sets the discard pattern to the storage area of the network interface.

4. The information processing device according to claim 1,
wherein the discard pattern is a packet pattern for specifying destination port numbers of packets to be discarded, and
the processor of the network interface determines that the discard condition is satisfied if an area of the received packet indicating a destination port number matches a port number indicated by the discard pattern.

5. The information processing device according to claim 1,
wherein the processor of the network interface, if receiving a packet that does not satisfy the discard condition in a case in which the buffer memory does not have the necessary space, deletes a packet, among packets stored in the buffer memory, that has a lower priority level than the received packet, and stores the received packet to the buffer memory.

6. The information processing device according to claim 5,
wherein the priority level is set in accordance with a range covered by a destination address of a packet, such that, the smaller the range covered by the destination address, the higher the priority level of the packet.

7. The information processing device according to claim 6,
wherein a priority level of a packet with a unicast address in which an IP address of the information processing device is specified as a destination address is higher than a priority level of a packet with a multicast address in which a multicast address is specified as a destination address.

8. The information processing device according to claim 1, wherein the information processing device is a printer.

9. The information processing device according to claim 1,
wherein, if the information processing device is operating in the second power mode, a processor of the main controller acquires and processes packets buffered by the buffer memory of the network interface.

10. The information processing device according to claim 1, wherein
if the information processing device is operating in the second power mode, even packets satisfying a discard condition based on the discard pattern are stored to the buffer memory.

11. A control method of an information processing device including a main controller and a network interface including a buffer memory, wherein the information processing device is capable of operating in a plurality of power modes at least including a first power mode in which the information processing device is operated in a state in which power supplied to the main controller is limited and a second power mode in which the information processing device is operated in a state in which a greater amount of power can be supplied to the main controller than in the first power mode,
the control method comprising:
during transition from the first power mode to the second power mode, storing received packets to the buffer memory, starting a shift of power mode so that the power mode of the information processing device switches to the second power mode, and executing control such that, among packets that are received via the network interface during a period until when the information processing device starts operating in the second power mode, packets that satisfy a discard condition based on a discard pattern are not stored to the buffer memory and packets that do not satisfy a discard condition based on the discard pattern are stored to the buffer memory,
wherein one or more packets stored during the transition from the first power mode to the second power mode are transferred to the main controller.

12. An information processing device comprising:
a network interface including a buffer memory;
a main controller; and
a power controller that controls the supply of power to the network interface and the main controller by using a plurality of power modes at least including a first power mode in which the information processing device is operated in a state in which power supplied to the main controller is limited and a second power mode in which the information processing device is operated in a state in which a greater amount of power can be supplied to the main controller than in the first power mode,
wherein, in a case where the information processing device is operating in the first power mode, a processor of the network interface controls whether or not a received packet is stored based on a priority level of the received packet, and
wherein the priority level is set in accordance with a range covered by a destination address of the packet.

13. The information processing device according to claim 12, wherein
during the transition from the first power mode to the second power mode, a processor of the network interface controls whether or not the received packet is stored based on the priority level of the received packet.

14. The information processing device according to claim 12,
wherein a processor of the network interface stores received packets to the buffer memory and executes control such that, among packets that are received via the network interface during a period until when the information processing device starts operating in the second power mode based on power control by the power controller, packets that satisfy a discard condition based on a discard pattern are not stored to the buffer memory and packets that do not satisfy a discard condition based on the discard pattern are stored to the buffer memory.

15. The information processing device according to claim 12, wherein
one or more stored packets are transferred to the main controller.

16. The information processing device according to claim 12,
wherein the priority level is set in accordance with a range covered by a destination address of a packet, such that, the smaller the range covered by the destination address, the higher the priority level of the packet.

17. The information processing device according to claim 12,
wherein a priority level of a packet with a unicast address in which an IP address of the information processing device is specified as a destination address is higher than a priority level of a packet with a multicast address in which a multicast address is specified as a destination address.

18. The information processing device according to claim 12, wherein the information processing device is a printer.

19. A control method of an information processing device including a main controller and a network interface including a buffer memory, wherein the information processing device is capable of operating in a plurality of power modes at least including a first power mode in which the information processing device is operated in a state in which power supplied to the main controller is limited and a second power mode in which the information processing device is operated in a state in which a greater amount of power can be supplied to the main controller than in the first power mode,
the control method comprising:
in a case where the information processing device is operating in the first power mode, controlling whether or not a received packet is stored based on a priority level of the received packet,
wherein the priority level is set in accordance with a range covered by a destination address of the packet.

* * * * *